United States Patent [19]

Brueggemann

[11] Patent Number: 4,512,625
[45] Date of Patent: Apr. 23, 1985

[54] SCANNER OPTICS WITH NO CROSS SCAN FIELD CURVATURE

[75] Inventor: Harry P. Brueggemann, San Marino, Calif.

[73] Assignee: Xerox Corporation, Stamford, Conn.

[21] Appl. No.: 433,340

[22] Filed: Oct. 8, 1982

[51] Int. Cl.³ .............................................. G02B 27/17
[52] U.S. Cl. .................................................. 350/6.8
[58] Field of Search ........................................ 350/6.8

[56] References Cited

U.S. PATENT DOCUMENTS 4,108,532  8/1978  Minoura ................................ 350/6.6
4,179,183 12/1979  Tateoka et al. ...................... 350/6.1
4,247,160  1/1981  Brueggeman ........................ 350/6.8

OTHER PUBLICATIONS

Fisli, "High Efficiency Symmetrical Scanning Optics", Optics and Laser Technology, vol. 14, No. 2, 4/1982, pp. 98-100.

Primary Examiner—John K. Corbin
Assistant Examiner—Rebecca D. Gass
Attorney, Agent, or Firm—Franklyn C. Weiss

[57] ABSTRACT

A lens system is described which allows a scan spot in a flying spot scanning system on the image surface to be focused in the cross scan plane and at the same time correcting field curvature distortion. The use of a first lens element having negative power in the scan direction and a second lens element having positive power in the cross scan plane on the front surface and positive power in scan plane on the rear surface allows a light from a laser to be reflected from a rotating polygon to be reflected from a concave cylindrical mirror onto a xerographic or other photosensitive surface.

9 Claims, 1 Drawing Figure

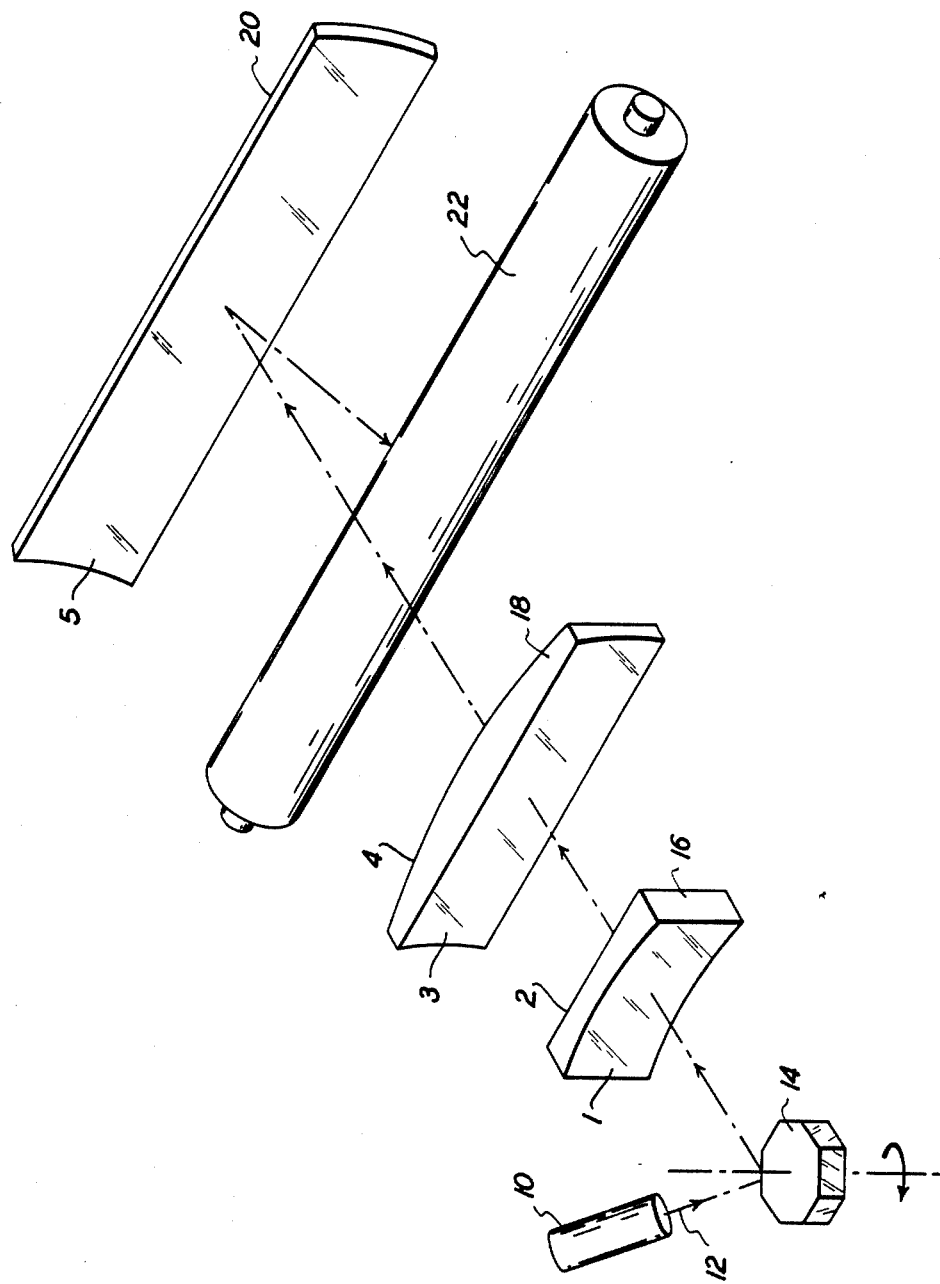

SCANNER OPTICS WITH NO CROSS SCAN FIELD CURVATURE

This invention relates to a flying spot scanning system which includes optics with no cross scan field curvature. A single lens with negative power in the cross scan direction and positive power in the tangential plane provides image correction for presentation to a concave cylindrical mirror.

BACKGROUND OF THE INVENTION

Scanning systems in modern day apparatus are becoming more accurate on the one hand but more complicated and expensive on the other hand. In certain optical image systems, a collimated source of light, as from a laser and associated optical lenses, impinges on a rotating polygon scanner which by the rotational movement thereof causes the reflected light to revolve about an axis near the center of rotation of the rotating polygon. The reflected light can be utilized to scan a document at the input end of an imaging system or can be used to impinge upon a photosensitive medium, such as a xerograhic drum, in the output mode. Many systems have been disclosed in the art to overcome various optical and other distortions in the optical flying spot imaging system.

For example, in U.S. Pat. No. 4,247,160, entitled "Scanner With Reflective Pyramid Error Compensation", issued to the same inventor and assignee as the present application, a laser beam scanner is disclosed having a positive cylinder mirror located between the polygon scanner and the photosensitive surface. The positive cylinder mirror, which has power in the cross scan plane but no power in the scan plane itself, minimizes scan to scan spot position errors due to angular alignment errors between adjacent facets of the polygon scanner without introducing significant cross scan field curvature. Residual cross scan field curvature is compensated for by providing a negative refractive cylinder lens with power in the cross scan plane between the cylindrical mirror and the polygon scanner.

Another patent application, Ser. No. 032,985, filed Apr. 25, 1979, entitled "Post-Polygon Objective Scanner", by the same inventor and assignee as the present application, now abandoned, discloses a scanning system in which the facets of a rotating polygon are illuminated by a collimated light beam, and a post-polygon objective, comprised of one negative lens element near the polygon and one positive lens element, is utilized to focus the monochromatic light beam at a photosensitive surface. The system provides a flat field of focus at the photosensitive surface, provides a constant linear scan rate across the photosensitive surface, eliminates bow distortion, and eliminates sensitivity to polygon facet alignment and fabrication errors, and has diffraction-limited performance.

According to the present invention, it was discovered that the positive cylinder mirror, which has power in the cross scan plane but no power in scan plane, as disclosed in the aforementioned U.S. Pat. No. 4,247,160, when utilized with the teachings of the aforementioned Ser. No. 032,985, specifically the teachings of a negative lens and positive lens, as one lens herein, provides a flat field of focus at the photosensitive surface with a constant linear scan rate across the surface.

DESCRIPTION OF THE DRAWINGS

For a more complete understanding of the invention, reference may be had to the following detailed description of the invention in conjunction with the drawing wherein the FIGURE is a part schematic and part isometric view of the scanning system utilizing combine scan and cross scan optics in accordance with the principles of the present invention.

DETAILED DESCRIPTION OF THE INVENTION

As set forth above, the present invention combines the advantages of the system shown in the aforementioned U.S. Pat. No. 4,247,160 with the use of a negative cylindrical element and the positive cylindrical element of the aforementioned Ser. No. 032,985, now abandoned. The FIGURE of the present application shows a laser 10 with its output light impinging on one facet of rotating prism 14. Not shown in the FIGURE are optical elements between the laser 10 and the rotating polygon 14. Any lens system which would be utilized to present a small spot size collimated light beam onto the facet can be used in this invention. These lens elements form no part of this invention, however. The laser 10 could be of the helium neon gas laser type which could generate a light beam 12 of wavelength 632.8 nanometers.

Polygon 14 would be rotated about its central axis by a means not shown. As each facet comes into alignment with the beam 12, the reflection from each of the facets causes a scanning of the light beam in the scan direction as shown in the FIGURE. This light would pass first through negative lens element 16, then through positive lens element 18, then reflected off of concave cylindrical mirror 20 onto the xerographic or other photosensitive surface 22. If the system is utilized in an input scanning arrangement, instead of an output scanning arrangement, then surface 22 could be a document or other object to be scanned.

Negative lens element 16 is shown to have a front surface 1 and a rear surface 2. Surface 1 has negative power in the scan plane and is shown concave to the front. When this invention was first tested, it was thought that a spherical curvature of surface 1 would be necessary. Similarly, surface 2 also had a spherical prescription of a small power. The positive lens element 18 has surfaces 3 and 4 as shown. Surface 3 has negative power only in the cross scan plane, having no power in the scan plane itself. Surface 4 of positive element 18, when first tested, also had a spherical prescription.

After the light passes through positive element 18, the light would impinge upon concave cylindrical mirror 20. This mirror surface 20 has, similar to surface 3, no power in the scan direction and has a power only in the cross scan direction. The combination of these elements focuses the scan spot on the image surface at every point thereof, and at the same time corrects field curvature. Thus, the present invention not only focuses the scan spot on the image surface in the cross scan plane regardless of possible wobbles or inconsistencies in the rotating polygon, but also corrects for the distorting effects of field curvature. The prescription for the first embodiment of the present invention is as follows:

TABLE I

| Surface | Curvature | Thickness | Glass | Remarks |
|---|---|---|---|---|
| Facet | 0.0 | 1.823025 | Air | |

TABLE I-continued

| Surface | Curvature | Thickness | Glass | Remarks |
|---|---|---|---|---|
| 1 | −0.06964871 | 0.400000 | LF7 | |
| 2 | +0.00932778 | 2.663073 | Air | |
| 3 Scan | 0.0 | 0.449240 | SF6 | Cylinder |
| X-Scan | −0.24325095 | | | |
| 4 | −0.09834167 | 6.708140 | Air | |
| 5 Scan | 0.0 | −18.981607 | Reflection | Cylinder |
| X-Scan | −0.07520941 | | | |
| IMAGE | 0.0 | 0.0 | | |
| Wavelength | | 632.8 nm | | |
| f/number, scan plane | | 107.2 | | |
| f/number, cross-section | | 139.2 | | |

Later experiments, however, showed that lenses with less of a prescription complexity could be utilized. For example, surface 1 in Table 1 above is shown to have a spherical prescription. However, it was found that having a power in the scan direction but not in the cross scan direction, that is, the cylindrical surface in the cross scan direction, would be just as effective. Similarly, surface 2 of negative lens element 16 could be plano rather than having the prescription set forth above in Table 1. Thus, negative element 16 became easier to fabricate because of its sole cylindrical surface on the front side and the plano surface on the rear side.

Similarly, it was found that surface 4 of positive element 18 could have no power in the cross scan direction with only a power in the scan direction. That is, surface 4 would be a cylinder with power in the scan direction while the front surface thereof would have power in the cross scan direction. These refinements to lens elements 16 and 18 considerably reduce the cost of fabrication of these elements while still maintaining the high principles of the present invention. A prescription for the lens element design as refined is as follows:

TABLE II

| Surface | Curvature | Thickness | Glass | Remarks |
|---|---|---|---|---|
| Facet | 0.0 | 1.823025 | Air | |
| 1 Scan | −0.07921873 | 0.400000 | LF7 | Cylinder |
| X-Scan | 0.0 | | | |
| 2 | 0.0 | 2.663073 | Air | |
| 3 Scan | 0.0 | 0.449240 | SF6 | Cylinder |
| X-Scan | −0.24325095 | | | |
| 4 Scan | −0.09834167 | 6.708140 | Air | Cylinder |
| X-Scan | 0.0 | | | |
| 5 Scan | 0.0 | −18.981607 | Reflection | Cylinder |
| X-Scan | 0.0788398 | | | |
| IMAGE | 0.0 | 0.0 | | |
| Wavelength | | 632.8 nm | | |
| f/number, scan plane | | 107.2 | | |
| f/number, cross-section | | 139.2 | | |

The LF7 and SF6 designations for the type of glass used are common terms for the lenses and are supplied, for example, by the Schott Glass Co. and Ohara Glass Co.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention:

What is claimed is:

1. In a flying spot scanning system including a rotating light-reflector 14 and a medium to be scanned, wherein the improvement is characterized by:

negative element lens means 16 in the optical path from said rotating light-reflector, positive element lens means 18 in the optical path from said rotating light-reflector and said negative element lens means, said negative element lens means and said positive element lens means focussing any light reflected by said rotating light-reflector, and mirror means 20 in the optical path from said positive element lens means 18 for reflecting any said light focussed thereby onto said medium to be scanned, wherein wobble effects of said rotating light-reflector and distorting effects of field curvature are effectively eliminated.

2. The flying spot scanning system as set forth in claim 1 wherein said negative element lens means 16 has a front surface 1 and a rear surface 2, said front surface 1 having negative power and is concave to the front, said rear surface 2 having a slight negative power and is concave to the rear, said positive element lens means 18 having a front surface 3 and a rear surface 4, said front surface 3 having power only in the cross scan plane and no power in the scan plane and is concave to the front, said rear surface 4 having a positive power and is convex to the rear, and said mirror means 20 being a concave cylindrical mirror 5 with no power in the scan direction and power only in the cross scan direction.

3. The flying spot scanning system as set forth in claim 2 according to the following characteristics:

| Surface | Curvature | Thickness | Glass | Remarks |
|---|---|---|---|---|
| Facet | 0.0 | 1.823025 | Air | |
| 1 | −0.06964871 | 0.400000 | LF7 | |
| 2 | +0.00932778 | 2.663073 | Air | |
| 3 Scan | 0.0 | 0.449240 | SF6 | Cylinder |
| X-Scan | −0.24325095 | | | |
| 4 | −0.09834167 | 6.708140 | Air | |
| 5 Scan | 0.0 | −18.981607 | Reflection | Cylinder |
| X-Scan | −0.07520941 | | | |
| IMAGE | 0.0 | 0.0 | | |
| Wavelength | | 632..8 nm | | |
| f/number, scan plane | | 107.2 | | |
| f/number, cross-section | | 139.2 | | |

4. The flying spot scanning system as set forth in claim 1 wherein said negative element lens means 16 has a front surface 1 and a rear surface 2, said front surface 1 is a cylindrical surface, concave to the front, with power in the scan direction and no power in the cross scan direction, said rear surface 2 being plano, said positive element lens means 18 having a front surface 3 and a rear surface 4, said front surface 3 being a cylindrical surface, concave to the front, having power only in the cross scan plane and no power in the scan plane, said rear surface 4 being a cylindrical surface, convex to the rear, with power only in the scan plane and no power in the cross scan plane, and said mirror means 20 being a concave cylindrical mirror 5 with no power in the scan direction and power only in the cross scan direction.

5. The flying spot scanning system as set forth in claim 4 according to the following characteristics:

| Surface | Curvature | Thickness | Glass | Remarks |
|---|---|---|---|---|
| Facet | 0.0 | 1.823025 | Air | |

-continued

| Surface | Curvature | Thickness | Glass | Remarks |
|---|---|---|---|---|
| 1 Scan | −0.07921873 | 0.400000 | LF7 | Cylinder |
| X-Scan | 0.0 | | | |
| 2 | 0.0 | 2.663073 | Air | |
| 3 Scan | 0.0 | 0.449240 | SF6 | Cylinder |
| X-Scan | −0.24325095 | | | |
| 4 Scan | −0.09834167 | 6.708140 | Air | Cylinder |
| X-Scan | 0.0 | | | |
| 5 Scan | 0.0 | −18.981607 | Reflection | Cylinder |
| X-Scan | −0.0788398 | | | |
| IMAGE | 0.0 | 0.0 | | |
| Wavelength | | 632.8 nm | | |
| f/number, scan plane | | 107.2 | | |
| f/number, cross-section | | 139.2 | | |

6. In a laser scanning system including a light beam 12, and a movable light-reflective element 14 located along the optical path of said light beam and a medium 22 for receiving said light beam, wherein the improvement is characterized by a lens and mirror system interposed between said light-reflective element 14 and said medium 22, said system comprising, a negative element lens 16 adjacent to said movable light-reflective element having a front surface 1 and a rear surface 2, said front surface 1 being a cylindrical surface, concave to the front, with power in the scan direction and no power in the cross scan direction, said rear surface 2 being piano, a positive element lens 18 adjacent to said negative element lens 16 having a front surface 3 and a rear surface 4, said front surface 3 being a cylindrical surface, concave to the front, having power only in the cross scan plane and no power in the scan plane, said rear surface 4 being a cylindrical surface, convex to the rear, with power only in the scan plane and no power in the cross scan plane, and mirror means 20 adjacent to said positive element lens means 18 being a concave cylindrical mirror 5 with no power in the scan direction and power only in the cross scan direction.

7. An optical scanning system including a rotating light-reflector 14 for reflecting a light beam into a moving plane of light, and a medium to be scanned in said plane of light, the improvement comprising:

a negative element lens 16 in the optical path from said rotating light-reflector 14, said lens 16 having a front surface 1 and a rear surface 2, said front surface 1 being a cylindrical surface, concave to the front, with power in the scan direction only, and no power in the cross scan direction, said rear surface 2 being plano, a positive element lens 18 in the optical path of light from said negative element lens 16, said lens 18 having a front surface 3 and a rear surface 4, said front surface 3 being a cylindrical surface, concave to the front, having power only in the cross scan plane and no power in the scan plane, said rear surface 4 being a cylindrical surface, convex to the rear, with power only in the scan plane and no power in the cross scan plane, and a mirror 20 in the optical path of light from said positive element lens 18 for reflecting said light onto said medium to be scanned 22, said mirror 20 being a concave cylindrical mirror 5 with no power in the scan direction and power only in the cross scan direction, wherein wobble effects of said rotating light-reflector 14 and distorting effects of field curvature are effectively eliminated.

8. The flying spot scanning system as set forth in Claim 1 wherein said positive element lens means 18 has a front surface 3 and a rear surface 4, said front surface 3 having power only in the cross scan plane and no power in the scan plane and is concave to the front, said rear surface 4 having a positive power and is convex to the rear.

9. The flying spot scanning system as set forth in Claim 1 wherein said positive element lens means 18 has a front surface 3 and a rear surface 4, said front surface 3 being a cylindrical surface, concave to the front, having power only in the cross scan plane and no power in the scan plane, said rear surface 4 being a cylindrical surface, convex to the rear, with power only in the scan plane and no power in the cross scan plane.

* * * * *